(12) United States Patent
Proverb et al.

(10) Patent No.: US 7,608,665 B2
(45) Date of Patent: Oct. 27, 2009

(54) TEMPORARY WET STRENGTH RESIN FOR PAPER APPLICATIONS

(75) Inventors: Robert Joseph Proverb, Woodbury, CT (US); Lucyna M. Pawlowska, Norwalk, CT (US)

(73) Assignee: Lanxess Corporation, Pittsburgh, PA (US)

( * ) Notice: Subject to any disclaimer, the term of this patent is extended or adjusted under 35 U.S.C. 154(b) by 582 days.

(21) Appl. No.: 11/241,565

(22) Filed: Sep. 30, 2005

(65) Prior Publication Data

US 2007/0078233 A1    Apr. 5, 2007

(51) Int. Cl.
*C08L 39/00* (2006.01)
*C08L 33/26* (2006.01)
*C08L 33/00* (2006.01)
*D21H 17/00* (2006.01)

(52) U.S. Cl. .................... 525/155; 525/154; 525/328.2; 525/328.3; 525/328.4; 525/329.4

(58) Field of Classification Search .............. 525/154, 525/155, 328.2, 328.3, 328.4, 329.4
See application file for complete search history.

(56) References Cited

U.S. PATENT DOCUMENTS 3,556,932 A    1/1971   Coscia et al. ............... 162/166
4,603,176 A    7/1986   Bjorkquist et al.
4,605,702 A    8/1986   Guerro et al. ............... 525/154

FOREIGN PATENT DOCUMENTS

WO    9802611 A1    1/1998

OTHER PUBLICATIONS

International Search Report; International Application No. PCT/US2006/038218; Date of Mailing: Jan. 17, 2007.
Written Opinion; International Application No. PCT/US2006/038218; Date of Mailing: Jan. 17, 2007.

*Primary Examiner*—Ana L Woodward
(74) *Attorney, Agent, or Firm*—Cantor Colburn LLP

(57) ABSTRACT

A thermosetting resin comprising a reacted A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxal component; such that the first polyacrylamide backbone has a molecular weight that is less than the molecular weight of the second polyacrylamide backbone; and the first polyacrylamide backbone and the second polyacrylamide backbone have a weight ratio ranging from 75:25 to 95:5. Methods for making and using the resin. Fibrous substrates made with the resin.

13 Claims, No Drawings

TEMPORARY WET STRENGTH RESIN FOR PAPER APPLICATIONS

BACKGROUND

The industry has had a long felt need for a thermosetting resin that is capable of imparting a highly useful combination of high dry tensile strength and high temporary wet strength to a paper product.

U.S. Pat. No. 3,556,932, for instance, discloses a composition that imparts high dry tensile strength to paper. Unfortunately, it has been discovered that the resin loses approximately only 50% of its wet tensile when soaked in water for 30 minutes. Paper manufacturers and consumers would prefer to have a resin that loses more during such a period of time. U.S. Pat. No. 4,605,702 discloses a composition that imparts high temporary wet strength properties to paper such that 60 to 80% of the wet tensile is lost when soaked in water for 30 minutes.

It would be highly useful to develop a resin, which when applied to paper, has a temporary wet tensile properties of the same order of magnitude as U.S. Pat. No. 4,605,702 but a dry tensile strength intermediate to both U.S. Pat. Nos. 3,556,932 and 4,605,702.

For the foregoing reasons, there is a need to develop an improved thermosetting strength resin.

SUMMARY

The invention relates to a thermosetting resin comprising a reacted A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxyal component. The first polyacrylamide backbone has a molecular weight that is less than the molecular weight of the second polyacrylamide backbone, and the first polyacrylamide backbone and the second polyacrylamide backbone have a weight ratio ranging from 75:25 to 95:5.

In one embodiment, the invention relates to a method for making a thermosetting resin including the steps of: (a) treating a first polyacrylamide backbone with a first glyoxal component, glyoxalating the first polyacrylamide backbone, and thereby forming a first partially crosslinked polyacrylamide backbone; (b) adding a second polyacrylamide backbone and a second glyoxal component to the first partially crosslinked backbone, thereby glyoxalating the first partially crosslinked polyacrylamide backbone and the second crosslinked polyacrylamide backbone in situ and forming the thermosetting resin, such that the first polyacrylamide backbone has a lower molecular weight than the molecular weight of the second polyacrylamide backbone; and the first polyacrylamide backbone and the second polyacrylamide backbone have a weight ratio ranging from 75:25 to 95:5.

In another embodiment, the invention relates to a method for making paper comprising treating a fibrous substrate with a thermosetting resin, and forming the paper, wherein the resin comprises reacted:

A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxyal component;

wherein the first polyacrylamide backbone has a molecular weight that is less than the molecular weight of the second polyacrylamide backbone; and wherein the first polyacrylamide backbone and the second polyacrylamide backbone have a weight ratio ranging from 75:25 to 95:5.

In another embodiment, the invention relates to a paper product that is the reaction product of a fibrous substrate and a thermosetting resin comprising a reacted A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxyal component, such that the first polyacrylamide backbone has a molecular weight that is less than the molecular weight of the second polyacrylamide backbone, and the first polyacrylamide backbone and the second polyacrylamide backbone have a weight ratio ranging from 75:25 to 95:5.

These and other features, aspects, and advantages of the present invention will become better understood with reference to the following description and appended claims.

DESCRIPTION

The invention is based on the discovery that under carefully controlled conditions, it is possible to make a thermosetting resin that imparts a highly useful combination of high dry tensile strength and high temporary wet strength to a paper product under certain conditions.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The thermosetting resin of the invention includes a reacted A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxyal component. The first polyacrylamide backbone has a molecular weight that is less than the molecular weight of the second polyacrylamide backbone, and the first polyacrylamide backbone and the second polyacrylamide backbone have a weight ratio ranging from 75:25 to 95:5.

The first polyacrylamide backbone is a vinyl addition polymer that is selected from the group consisting of (meth)acrylamide, vinyl acetate, styrene, methyl(meth)acrylateuu, (meth)acrylic acid, vinyl alcohol, diallyldimethylammonium chloride, diallyldimethylammonium sulfate, vinyl pyrrolidone, (meth)acrylonitrile, dimethylaminoethyl(meth)acrylate, dimethylaminoethyl(meth)acrylate quaternaries, diethylaminoethyl (meth)acrylate, diethylaminoethyl(meth) acrylate quaternaries, N-methylol acrylamide, manniched acrylamide quaternaries, hydroxyethyl (meth)acrylate, hydroxypropyl(meth)acrylate, (meth)acrylamidopropyltrimethylammonium chloride, succinic acid, itaconic acid, maleic acid, alkylcarboxyvinyl amine, and combinations thereof.

The first polyacrylamide backbone and the second polyacrylamide backbone generally have a weight ratio ranging from 75:25 to 95:5. In one embodiment, the first polyacrylamide backbone and the second polyacrylamide backbone have a weight ratio ranging from 80:20 to 90:10. The first backbone has a weight average molecular weight ranging from 500 to 5000 daltons. In one particularly useful embodiment, the first backbone has a weight average molecular weight 2000 daltons. In one embodiment, the first partially crosslinked glyoxalated polyacrylamide backbone has a cationic charge.

The second polyacrylamide backbone is a vinyl addition polymer selected from the group consisting of (meth)acrylamide, vinyl acetate, styrene, methyl(meth)acrylate, (meth)acrylic acid, vinyl alcohol, diallyidimethylammonium chloride, diallyldimethylammonium sulfate, vinyl pyrrolidone, (meth)acrylonitrile, dimethylaminoethyl(meth)acrylate, dimethylaminoethyl(meth)acrylate quaternaries, diethylaminoethyl (meth)acrylate, diethylaminoethyl(meth)acrylate quaternaries, N-methylol acrylamide, manniched acrylamide quaternaries, hydroxyethyl (meth)acrylate, hydroxypropyl (meth)acrylate, (meth)acrylamidopropyltrimethylammonium chloride, succinic acid, itaconic acid, maleic acid, alkylcarboxyvinyl amine, and combinations thereof.

The second backbone has a weight average molecular weight ranging from 6000 to 25,000 daltons. In one particularly useful embodiment, the second backbone has a weight average molecular weight 12,000 daltons.

The charge of the first or second polyacrylamide backbones can vary, depending on the application and the product specifications that are required in a given situation.

In one embodiment, when the resin is nonionic or ionic, the first partially crosslinked glyoxalated polyacrylamide backbone or the second polyacrylamide backbone further includes a non-ionic or anionic component selected from the group consisting of acrylamide, acrylic acid methacrylic acid, succinic acid, itaconic acid, and methacrylamide.

In another embodiment, when the resin is nonionic or ionic, the resin further comprises (i) a first partially crosslinked glyoxalated polyacrylamide backbone or (ii) the second polyacrylamide backbone further comprises non-ionic component selected from the group consisting of styrene copolymers, acrylate ester, methacrylate ester, vinyl acetate, and combinations thereof. In one embodiment, the first polyacrylamide backbone has a cationic charge. In another embodiment, the second polyacrylamide backbone has a cationic charge.

Advantageously, the invention also provides a method for making a thermosetting resin that involves the steps of (a) treating a first polyacrylamide backbone with a first glyoxal component, glyoxalating the first polyacrylamide backbone, and thereby forming a first partially crosslinked polyacrylamide backbone; (b) adding a second polyacrylamide backbone and a second glyoxal component to the first partially crosslinked backbone, thereby glyoxalating the first partially crosslinked polyacrylamide backbone and the second crosslinked polyacrylamide backbone in situ and forming the thermosetting resin, such that the first polyacrylamide backbone has a lower molecular weight than the molecular weight of the second polyacrylamide backbone; and the first polyacrylamide backbone and the second polyacrylamide backbone have a weight ratio ranging from 75:25 to 95:5.

The conditions at which the resin is made can vary, depending on factors such as available equipment, specific needs, and the like. The glyoxalation pH of the first and second stages in steps (a) and (b), ranges from 7 to 9. In one embodiment, the pH is from 7.5 to 8.5. In another embodiment, the pH ranges from 7.9 to 8.3.

The method is carried out at a temperature ranging from 15 to 35° C. In another embodiment, the temperature ranges from 25 to 32° C., or from 27 to 30° C. The simultaneous glyoxalation of the first polyacrylamide backbone and the second polyacrylamide backbone can continue until the solution has a viscosity that is sufficient to make a resin with the properties of this invention. Generally, the simultaneous glyoxalation of the first polyacrylamide backbone and the second polyacrylamide backbone continues until the solution has a #3 Shell Cup viscosity of 27 seconds.

The first partially crosslinked backbone solution has a viscosity that varies, depending on the application. In one embodiment, the first partially crosslinked backbone solution has a #3 Shell Cup viscosity of 9 seconds.

The solids content of the first partially crosslinked backbone solution varies depending on the application. In one embodiment, the first partially crosslinked backbone solution has a solids content ranging from 17 to 22%. In another embodiment, the first partially crosslinked backbone solution has a solids content ranging from 18 to 20%. The solids content of the final resin that is produced generally is at least 17% and can range from 17% to 24%.

In one embodiment, the method further includes the step of glyoxalating the first polyacrylamide backbone and the second polyacrylamide backbone simultaneously, under conditions that cause the formation of the thermosetting resin.

In one embodiment, the resin composition is added to a dilute aqueous suspension of paper pulp and the pulp is formed into a fiber mat, and dried in a known manner. The fibrous substrate treated with the strength composition can be any substrate of a paper product, which when treated with the strength composition made in accordance to the invention, acquires strength properties that are suitable for its intended use. In one embodiment, the fibrous substrate of the invention can include any fibrous substrate of a pulp slurry used to make paper products. Generally, the invention can be used in slurries forming dry board, fine paper, towel, tissue and newsprint products. Dry board applications include liner, corrugated medium and bleached.

The paper product made from the fibrous substrate may include paper or board, bleached or unbleached that is treated on the surface in a size press or by spraying with a sizing composition of the invention.

In use, the invention advantageously provides a method for making paper that includes the steps treating a fibrous substrate with a thermosetting resin containing the reacted a thermosetting resin comprising a reacted A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxal component;

where the first polyacrylamide backbone has a molecular weight that is less than the molecular weight of the second polyacrylamide backbone; and the first polyacrylamide backbone and the second polyacrylamide backbone have a weight ratio ranging from 75:25 to 95:5.

The resin made in accordance to the invention can be applied by a variety of ways. In one embodiment, for instance, the resin composition is added at the size press. Alternatively, the resin composition can be added at a water box. Also, the resin composition is applied using a spraying application. The method is a versatile system that allows papermakers to work under various conditions, depending on their respective needs. The method of the invention allows papermakers to now make paper which requires the particular combination of high dry tensile strength and high temporary wet strength to a paper product.

In one embodiment, the invention also includes a paper product containing the reaction product of a thermosetting resin comprising a reacted A) first partially crosslinked glyoxalated polymer comprising a reacted (i) first polyacrylamide backbone and (ii) a first glyoxal component; and B) a second crosslinked glyoxalated polymer comprising a reacted (i) second polyacrylamide backbone and (ii) a second glyoxyal component; where the first polyacrylamide backbone has a molecular weight that is less than the molecular weight of the second polyacrylamide backbone; and the first polyacrylamide backbone and the second polyacrylamide backbone have a weight ratio ranging from 75:25 to 95:5 and (C) a fibrous substrate component. The finished product can include paperboard, fine paper, newsprint, other wood-containing paper grades, and combinations thereof.

The resin imparts useful properties to fibrous substrates. For instance, when the resin treats a tissue fibrous substrate, the tissue fibrous substrate exhibits a thirty minute temporary wet strength decay ranging from 60% to 80%. The resin of the invention, when used in accordance to the invention, produces fibrous substrates having a temporary wet tensile properties of the same order of magnitude as U.S. Pat. No. 4,605,702 but a dry tensile strength intermediate to both U.S. Pat. Nos. 3,556,932 and 4,605,702.

The invention is further described in the following illustrative examples in which all parts and percentages are by weight unless otherwise indicated.

EXAMPLES

Example 1

The first backbone, component A, was prepared according to U.S. Pat. No. 4,605,702. The second backbone, component B, was prepared according to U.S. Pat. No. 3,556,932. A glass vessel equipped with a magnetic stirring bar, pH meter probe and thermometer was charged with 178.01 parts of 25.28% component A, 47.7 parts of water, and 36.88 parts of 40% glyoxal. The solution was maintained at 30° C. by means of a heating bath during the course of the method. While stirring, the pH of the solution was adjusted to 8.3 with 9 parts of 10% sodium hydroxide. Total organic solids in the solution was 22%. The reaction was maintained at pH 8.3. Progress of the reaction was monitored by means of a #3 Shell cup. When viscosity has advanced to 9 seconds, a second charge to the vessel is made. This charge was comprised of 25.57 parts of 44% component B, 9.22 parts of 40% glyoxal, and 107.04 parts of water. The pH was adjusted to 8.3 with 1.5 parts of 10% sodium hydroxide. Again, a pH of 8.3 was maintained by periodic addition of 10% sodium hydroxide. Temperature was also maintained at 30° C. When a viscosity of 22 seconds was achieved, the pH was decreased to 7.8 with 10% sulfuric acid. When a viscosity of 27 seconds was achieved, the reaction was quenched by adjusting the pH of the polymer solution to 3.2. Total reaction time is 5.25 hr.

Example 2

A vessel equipped with a magnetic stirring bar, pH meter probe and thermometer was charged with 184.96 parts of 24.33% component A, 40.3 parts of water and 36.88 parts of 40% glyoxal. The solution was maintained at 30° C. by means of a heating bath during the course of the method. While stirring, the pH of the solution was adjusted to 8.3 with 9.45 parts of 10% sodium hydroxide. Total organic solids in the solution was 22%. The reaction was maintained at pH 8.3. The progress of the reaction was monitored by means of a #3 Shell cup. When the viscosity has advanced to 9 seconds, a second charge to the vessel is made. This charge contained 11.36 parts of 44% component B, 4.1 parts of 40% glyoxal, and 80.82 parts of water. The pH was adjusted to 8.3 with 0.96 parts of 10% sodium hydroxide. The temperature was also maintained at 30° C. After addition of the second charge, the ratio between components A and B on a real weight basis was 90 to 10 and total organic solids in the solution was 18%. When a viscosity of 22 seconds was achieved, the pH was decreased to 7.5 with 10% sulfuric acid. When a viscosity of 27 seconds was achieved, the reaction was quenched by adjusting the pH of the polymer solution to 3.3. The total reaction time was 6 hr 35 min.

To an aqueous pulp at 0.6% consistency and pH 5.5 composed of 1:1 softwood:hardwood fibers beaten to a CSF of 486 ml was added sufficient quantity of the glyoxalated copolymer of Example 1 to provide a dose of 5 kilograms of resin per ton of dry pulp. The pulp pH was adjusted to 5.5 and the mixture was then stirred briefly to permit absorption of the resin onto the fiber. From this mixture was then produced several twenty centimeters by twenty centimeters, 74 grams per square meter basis weight hand sheets using a stationary deckle Noble and Wood papermaking machine. The web was pressed between blotters and dried on a rotary drum drier at a temperature of 116° C. Tensile testing of paper thus formed was accomplished according to TAPPI Test Methods # T 456, UM 453. The results are set forth in Table 1, below. The % Decay was determined by soaking the treated paper in water (as described in U.S. Pat. No. 4,603,176) for 30 minutes.

TABLE 1

| Resin | Dose (kg/ton) | Tensile Strength (dry) (kN/m) | Tensile Strength Wet (kN/m) | Tensile Strength 30 minute soak (kN/m) | % Decay |
|---|---|---|---|---|---|
| Example 1 | 5 | 3.23 | 0.45 | 0.16 | 63.7 |
| Example 2 | 5 | 3.89 | 0.47 | 0.12 | 67.9 |
| U.S. Pat. No. 4,605,702 (Comparative) | 5 | 3.08 | 0.39 | 0.14 | 64.1 |
| U.S. Pat. No. 3,556,932 (Comparative) | 5 | 3.74 | 0.49 | 0.28 | 41.9 |

These experiments show the 80/20 and 90/10 ratios of backbones prepared according to the preferred method. The table contains comparative data for PAREZ® 631 NC Wet Strength Resin (U.S. Pat. No. 3,556,932) and PAREZ® 745 Wet Strength Resin (U.S. Pat. No. 4,605,702).

Example 3

A vessel equipped with a magnetic stirring bar, pH meter probe and thermometer was charged with 184.96 parts of 24.33% component A, 40.3 parts of water and 36.88 parts of 40% glyoxal. The solution was maintained at 30° C. by means of a heating bath during the course of the method. While stirring, the pH of the solution was adjusted to 8.3 with 9.32 parts of 10% sodium hydroxide. Total organic solids in the solution were 22%. The reaction was maintained at pH 8.3. Progress of the reaction was monitored by means of a #3 Shell cup. When the viscosity had advanced to 9 seconds, a second charge to the vessel was made. This charge was composed of 43.83 parts of 44% component B, 15.8 parts of 40% glyoxal and 139.65 parts of water. The pH was adjusted to 8.3 with 3.13 parts of 10% sodium hydroxide. Temperature was also maintained at 30° C. After addition of the second charge, the ratio between components A and B on a real weight basis is 70 to 30 and total organic solids in the solution was 18%. When a viscosity of 22 seconds was achieved, the pH was decreased to 7.5 with 10% sulfuric acid. When a viscosity of 27 seconds was achieved, the reaction was quenched by adjusting the pH of the polymer solution to 3.3. Total reaction time was 4 hr 55 min. The results are shown in Table 2 below.

TABLE 2

| Resin | Dose (kg/ton) | Tensile Strength (dry) (kN/m) | Tensile Strength Wet (kN/m) | Tensile Strength 30 minute soak (kN/m) | % Decay |
|---|---|---|---|---|---|
| Example 3 | 5 | 3.55 | 0.30 | 0.20 | 31.98 |
| U.S. Pat. No. 3,556,932 Comparative | 5 | 3.75 | 0.48 | 0.28 | 41.76 |

This experiment shows that a 70/30 ratio of backbones prepared according to the preferred method provides a resin with essentially equivalent performance to PAREZ 631 NC, and therefore does not possess the requisite temporary wet strength.

Comparative Example 4

A vessel equipped with a magnetic stirring bar, pH meter probe and thermometer was charged with 69.41 parts of 26.18% component A, 4.57 parts of 44.15% component B, 26.21 parts of water and 16.55 parts of 40% glyoxal. The ratio between components A and B on a real weight basis was 90 to 10. solution was maintained at 30° C. by means of a heating bath during the course of the method. While stirring, the pH of the solution was adjusted to 8.3 with 4.08 parts of 10% sodium hydroxide. Total organic solids in the solution was 22.19%. The reaction was maintained at pH 8.3. Progress of the reaction was monitored by means of a #3Shell cup. When a viscosity of 22 seconds was achieved, the pH was decreased to 7.5 with 10% sulfuric acid. When viscosity of 27 seconds was achieved, the reaction was quenched by adjusting the pH of the polymer solution to 3.3. Total reaction time was 3 hr 20 min.

Comparative Example 5

A vessel equipped with a magnetic stirring bar, pH meter probe and thermometer was charged with 61.69 parts of 26.18% component A, 9.15 parts of 44.15% component B, 29.43 parts of water, and 16.55 parts of 40% glyoxal. The ratio between components A and B on a real weight basis was 80 to 20. The solution was maintained at 30° C. by means of a heating bath during the course of the method. While stirring, the pH of the solution was adjusted to 8.3 with 4.0 parts of 10% sodium hydroxide. Total organic solids in the solution was 22.19%. The reaction was maintained at pH 8.3. Progress of the reaction was monitored by means of a #3 Shell cup. When viscosity of 22 seconds was achieved, the pH was decreased to 7.5 with 10% sulfuric acid. When viscosity of 27 seconds was achieved, the reaction was quenched by adjusting the pH of the polymer solution to 3.3. Total reaction time was 1 hr 45 min.

Comparative Example 6

A vessel equipped with a magnetic stirring bar, pH meter probe and thermometer was charged with 53.98 parts of 26.18% component A, 13.72 parts of 44.15% component B, 32.54 parts of water, and 16.55 parts of 40% glyoxal. The ratio between components A and B on a real weight basis was 70 to 30. The solution was maintained at 30° C. by means of a heating bath during the course of the method. While stirring, the pH of the solution was adjusted to 8.3 with 4.03 parts of 10% sodium hydroxide. Total organic solids in the solution was 22.19%. The reaction was maintained at pH 8.3. Progress of the reaction was monitored by means of a #3 Shell cup. When a viscosity of 22 seconds was achieved, the pH was decreased to 7.5 with 10% sulfuric acid. When a viscosity of 27 seconds was achieved, the reaction was quenched by adjusting the pH of the polymer solution to 3.3. Total reaction time was 1 hr 25 min.

Comparative Example 7

A vessel equipped with a magnetic stirring bar, pH meter probe and thermometer was charged with 46.27 parts of 26.18% component A, 18.28 parts of 44.15% component B, 36.01 parts of water, and 16.55 parts of 40% glyoxal. The ratio between components A and B on a real weight basis was 60 to 40. The solution was maintained at 30° C. by means of a heating bath during the course of the method. While stirring, the pH of the solution was adjusted to 8.3 with 3.7 parts of 10% sodium hydroxide. Total organic solids in the solution was 22.19%. The reaction was maintained at pH 8.3. Progress of the reaction was monitored by means of a #3 Shell cup. When viscosity of 22 seconds was achieved, the pH was decreased to 7.5 with 10% sulfuric acid. When a viscosity of 27 seconds was achieved, the reaction was quenched by adjusting the pH of the polymer solution to 3.3. Total reaction time was 1 hr 30 min. The results are shown in Table 3 below.

TABLE 3

| Resin | Ratio | Dose (kg//ton) | Dry (kN/m) | Tensile Strength Wet (kN/m) | 30 Min Soak (kN/m) | % Decay |
|---|---|---|---|---|---|---|
| Comparative Example 4 | 90:10 | 5 | 3.46 | 0.40 | 0.20 | 50.88 |
| Comparative Example 5 | 80:20 | 5 | 3.38 | 0.35 | 0.18 | 48.76 |
| Comparative Example 6 | 70:30 | 5 | 3.24 | 0.33 | 0.17 | 47.34 |
| Comparative Example 7 | 60:40 | 5 | 3.42 | 0.34 | 0.20 | 41.24 |
| Comparative Example U.S. Pat. No. 4,605,702 | | 5 | 3.48 | 0.43 | 0.18 | 58.90 |
| Comparative Example U.S. Pat. No. 3,556,932 | | 5 | 3.73 | 0.56 | 0.31 | 44.79 |

These experiments demonstrate the resins prepared by blending both backbones together prior to glyoxalation. In order, they are the 90/10, 80/20, 70/30 and 60/40 backbones which are subsequently glyoxalated under standard conditions. Only the 90/10 example (Example 4) demonstrates results which are close to the PAREZ 745 resin control. However, it also demonstrates that the % decay was not as good as that in PAREZ 745resin. Each of these blend shows dry strength properties which are not superior to the PAREZ 745 resin control and the % decay diminishes as the amount of the higher molecular weight backbone was increased.

Comparative Example 8

A vessel equipped with a magnetic stirring bar, pH meter probe and thermometer was charged with 133.7 parts of 24.33% component A, 18.48 parts of 44% component B, 106.99 parts of water, and 33.35 parts of 40% glyoxal. The ratio between components A and B on a real weight basis was 80 to 20. The solution was maintained at 30° C. by means of a heating bath during the course of the method. While stirring, the pH of the solution was adjusted to 8.3 with 7.5 parts of 10% sodium hydroxide. Total organic solids in the solution was 18%. The reaction was maintained at pH 8.3. Progress of the reaction was monitored by means of a #3 Shell cup. When a viscosity of 21 seconds was achieved, the pH was decreased to 7.8 with 10% sulfuric acid. When a viscosity of 27 seconds was achieved, the reaction was quenched by adjusting the pH of the polymer solution to 3.3. Total reaction time was 3 hr 13 min.

Example 9

A vessel equipped with a magnetic stirring bar, pH meter probe and thermometer was charged with 167.12 parts of 24.33% component A, 61.27 parts of water and 33.35 parts of 40% glyoxal. The solution was maintained at 30° C. by means of a heating bath during the course of the method. While stirring, the pH of the solution was adjusted to 8.3 with 8.26 parts of 10% sodium hydroxide. Total organic solids in the solution was 20%. The reaction was maintained at pH 8.3. Progress of the reaction was monitored by means of a #3 Shell cup. When viscosity has advanced to 9 seconds, a second charge to the vessel was made. This charge was comprised of 23.11 parts of 44% component B, 8.34 parts of 40% glyoxal, and 34.75 parts of water. The pH was adjusted to 8.3 with 1.3 parts of 10% sodium hydroxide. Temperature was also maintained at 30° C. After addition of the second charge, the ratio between components A and B on a real weight basis was 80 to 20 and total organic solids in the solution was 20%. When a viscosity of 21 seconds was achieved, the pH was decreased to 7.9 with 10% sulfuric acid. When a viscosity of 30 seconds was achieved, the reaction was quenched by adjusting the pH of the polymer solution to 3.3. Total reaction time was 4 hr 10 min.

Comparative Example 10

A vessel equipped with a magnetic stirring bar, pH meter probe and thermometer was charged with 20.55 parts of 44% component B, 70.95 parts of water, and 7.4 parts of 40% glyoxal. The solution was maintained at 30° C. by means of a heating bath during the course of the method. While stirring, the pH of the solution was adjusted to 8.3 with 1.1 parts of 10% sodium hydroxide. Total organic solids in the solution was 12%. The reaction was maintained at pH 8.3. Progress of the reaction was monitored by means of a #3 Shell cup. When viscosity has advanced to 8 seconds, a second charge to the vessel was made. This charge was comprised of 148.62 parts of 24.33% component A and 29.64 parts of 40% glyoxal. The pH was adjusted to 8.3 with 6.4 parts of 10% sodium hydroxide. Temperature was also maintained at 30° C. After addition of the second charge, the ratio between components A and B on a real weight basis was 80 to 20 and total organic solids in the solution was 21.08%. When a viscosity of 22 seconds was achieved, the pH was decreased to 7.5 with 10% sulfuric acid. When a viscosity of 27 was achieved, the reaction was quenched by adjusting the pH of the polymer solution to 3.3. Total reaction time was 3 hr 30 min. The results are shown in Table 4 below.

TABLE 4

| Resin | Dose (kg/ton) | Tensile Strength Dry (kN/m) | Tensile Strength Wet (kN/m) | Tensile Strength 30 minute soak (kN/m) | % Decay |
|---|---|---|---|---|---|
| Example 8 Comparative | 5 | 3.26 | 0.47 | 0.23 | 52.03 |
| Example 9 | 5 | 3.28 | 0.51 | 0.08 | 83.51 |
| Example 10 Comparative | 5 | 3.14 | 0.41 | 0.22 | 45.73 |
| U.S. Pat. No. 4,605,702 Comparative | 5 | 2.96 | 0.42 | 0.16 | 62.4 |
| U.S. Pat. No. 3,556,932 Comparative | 5 | 3.54 | 0.53 | 0.34 | 37.05 |

As shown above in Table 4, Example 8 shows that an 80/20 blend of backbones when glyoxalated at 18% solids gives improved dry tensile over PAREZ 745 but does not provide as good wet tensile decay. Example 9 shows that an 80/20 blend of backbones prepared according to this invention with the solids in the middle of the claimed ranged and with the second backbone being added after a development of viscosity of 9 sec provides a resin with acceptable dry tensile strength and with acceptable wet tensile decay. Example 10 illustrates the effect of reversing the addition of the backbones in the invention method. The higher molecular weight backbone was glyoxalated first and the lower molecular weight backbone was glyoxalated second. Although good dry tensile strength was observed, the % wet tensile decay was not acceptable.

Example 11

A vessel equipped with a magnetic stirring bar, pH meter probe and thermometer was charged with 66.38 parts of 24.33% component A, 13.61 parts of water, and 13.24 parts of 40% glyoxal. The solution was. maintained at 30° C. by means of a heating bath during the course of the method. While stirring, the pH of the solution was adjusted to 8.3 with 3.39 parts of 10% sodium hydroxide. Total organic solids in the solution was 22.2%. The reaction was maintained at pH 8.3. Progress of the reaction was monitored by means of a #3 Shell cup. When viscosity has advanced to 9 seconds, a second charge to the vessel was made. This charge was comprised of 9.18 parts of 44% component B, 3.31 parts of 40% glyoxal, and 10.83 parts of water. The pH was adjusted to 8.3 with 0.61 parts of 10% sodium hydroxide. Temperature was also maintained at 30° C. After addition of the second charge, the ratio between components A and B on a real weight basis was 80 to 20 and total organic solids in the solution was 22.2%. When a viscosity of 22 seconds was achieved, the pH was decreased to 7.9 with 10% sulfuric acid. When a viscosity of 27 seconds was achieved, the reaction was quenched by adjusting the pH of the polymer solution to 3.3. Total reaction time was 3 hr 16 min.

Example 12

A vessel equipped with a magnetic stirring bar, pH meter probe and thermometer was charged with 66.38 parts of 24.33% component A, 13.61 parts of water, and 13.24 parts of 40% glyoxal. The solution was maintained at 30° C. by means of a heating bath during the course of the method. While stirring, the pH of the solution was adjusted to 8.3 with 3.39 parts of 10% sodium hydroxide. Total organic solids in the solution was 22.2%. The reaction was maintained at pH 8.3. Progress of the reaction was monitored by means of a #3 Shell cup. When viscosity has advanced to 8 seconds, second charge to the vessel was made. This charge was comprised of 9.18 parts of 44% component B, 3.31 parts of 40% glyoxal, and 10.83 parts of water. The pH was adjusted to 8.3 with 0.53 parts of 10% sodium hydroxide. Temperature was also maintained at 30° C. After addition of the second charge, the ratio between components A and B on a real weight basis was 80 to 20 and total organic solids in the solution was 22.2%. When a viscosity of 22 seconds was achieved, the pH was decreased to 7.9 with 10% sulfuric acid. When a viscosity of 27 seconds was achieved, the reaction was quenched by adjusting the pH of the polymer solution to 3.3. Total reaction time was 3 hr 25 min. The results are shown in Table 5 below.

TABLE 5

| Resin | Dose (kg/ton) | Tensile Strength Dry (kN/m) | Tensile Strength Wet (kN/m) | Tensile Strength 30 Minute Soak (kN/m) | % Decay |
|---|---|---|---|---|---|
| Example 11 | 5 | 2.97 | 0.39 | 0.12 | 68.92 |
| Example 12 | 5 | 2.81 | 0.34 | 0.10 | 69.11 |
| U.S. Pat. No. 4,605,702 Comparative | 5 | 3.07 | 0.40 | 0.14 | 64.63 |

These experiments show the effect of glyoxalation of the second backbone at high solids. In both cases, acceptable wet tensile decay was obtained. The dry tensile development, however, was poorer than the control.

Although the present invention has been described in detail with reference to certain preferred versions thereof, other variations are possible. Therefore, the spirit and scope of the appended claims should not be limited to the description of the versions contained therein.

What is claimed is:

1. A thermosetting resin comprising a reaction product of:
A) a first partially crosslinked glyoxalated polymer comprising a reaction product of (i) a first polyacrylamide backbone and (ii) a first glyoxal component; and
B) a second crosslinked glyoxalated polymer comprising a reaction product of (i) a second polyacrylamide backbone and (ii) a second glyoxal component;
wherein the first polyacrylamide backbone has a molecular weight that is less than the molecular weight of the second polyacrylamide backbone; and
wherein the first polyacrylamide backbone and the second polyacrylamide backbone have a weight ratio ranging from 75:25 to 95:5.

2. The resin of claim 1, wherein the first polyacrylamide backbone and the second polyacrylamide backbone have a weight ratio ranging from 80:20 to 90:10.

3. The thermosetting resin of claim 1, wherein when the resin treats a tissue fibrous substrate, the tissue fibrous substrate exhibits a thirty minute temporary wet strength decay ranging from 60% to 80%.

4. The resin of claim 1, wherein the first polyacrylamide backbone is the polymerization product of an acrylamide monomer selected from the group consisting of (meth)acrylamide, N-methylol acrylamide, manniched acrylamide quaternarics, and combinations thereof, and, optionally, a further monomer selected from the group consisting of vinyl acetate, styrene, methyl (meth)acrylate, (meth)acrylic acid, vinyl alcohol, diallyldimethylammonium chloride, diallyldimethylammonium sulfate, vinyl pyrrolidone, (meth)acrylonitrile, dimethylaminoethyl (meth)acrylate, dimethylaminoethyl (meth)acrylate quaternaries, diethylaminoethyl (meth)acrylate, diethylaminoethyl (meth)acrylate quaternaries, hydroxyethyl (meth)acrylate, hydroxypropyl (meth)acrylate, (meth)acrylamidopropyltrimethylammonium chloride, succinic acid, itaconic acid, maleic acid, alkylcarboxyvinyl amine, and combinations thereof.

5. The resin of claim 1, wherein the second polyacrylamide backbone is the polymerization product of an acrylamide monomer selected from the group consisting of (meth)acrylamide, N-methylol acrylamidc, manniched acrylamide quaternarics, and combinations thereof, and, optionally, a further monomer selected from the group consisting of vinyl acetate, styrene, methyl (meth)acrylate, (meth)acrylic acid, vinyl alcohol, diallyldimethylammonium chloride, diallyldiniethylammonium sulfate, vinyl pyrrolidone, (meth)acrylonitrile, dimethylaniinoethyl (meth)acrylate, dimethylaminoethyl (meth)acrylate quaternaries, diethylaminoethyl (meth)acrylate, diethylaminoethyl (meth)acrylate quaternaries, hydroxyethyl (meth)acrylate, hydroxypropyl (meth)acrylate, (meth)-acrylamidopropyltrimethyl chloride, succinic acid, itaconic acid, maleic acid, alkylcarboxyvinyl amine, and combinations thereof.

6. The resin of claim 1, wherein the first polyacrylamide backbone has a weight average molecular weight ranging from 500 to 5000 daltons.

7. The resin of claim 1, wherein the first polyacrylamide backbone has a weight average molecular weight of 2000 daltons.

8. The resin of claim 1, wherein the second polyacrylamide backbone has a weight average molecular weight ranging from 6000 to 25,000 daltons.

9. The resin of claim 1, wherein the second polyacrylamide backbone has a weight average molecular weight of 12,000 daltons.

10. The resin of claim 1, wherein the resin is nonionic or ionic, and the polyacrylamide backbone or the second polyacrylamide backbone is the polymerization product of an acrylamide monomer selected from the group consisting of acrylamide, methacrylamide, and combinations thereof, and, optionally, a further monomer selected from the group consisting of acrylic acid, methacrylic acid, succinic acid, itaconic acid, and combinations thereof.

11. The resin of claim 1, wherein the resin is nonionic or ionic and the resin further comprises (i) a first partially crosslinked glyoxalated polyacrylamide backbone or (ii) the second polyacrylamide backbone further comprises nonionic component selected from the group consisting of styrene, acrylate ester, methacrylate ester, vinyl acetate, and combination thereof.

12. The resin of claim 1, wherein the first partially crosslinked glyoxalated polyacrylamide backbone has a cationic charge.

13. The resin of claim 1, wherein second polyacrylamide backbone has a cationic charge.

* * * * *

UNITED STATES PATENT AND TRADEMARK OFFICE
CERTIFICATE OF CORRECTION

| | | |
|---|---|---|
| PATENT NO. | : 7,608,665 B2 | Page 1 of 1 |
| APPLICATION NO. | : 11/241565 | |
| DATED | : October 27, 2009 | |
| INVENTOR(S) | : Proverb et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Twelfth Day of October, 2010

David J. Kappos
*Director of the United States Patent and Trademark Office*